Patented Sept. 15, 1942

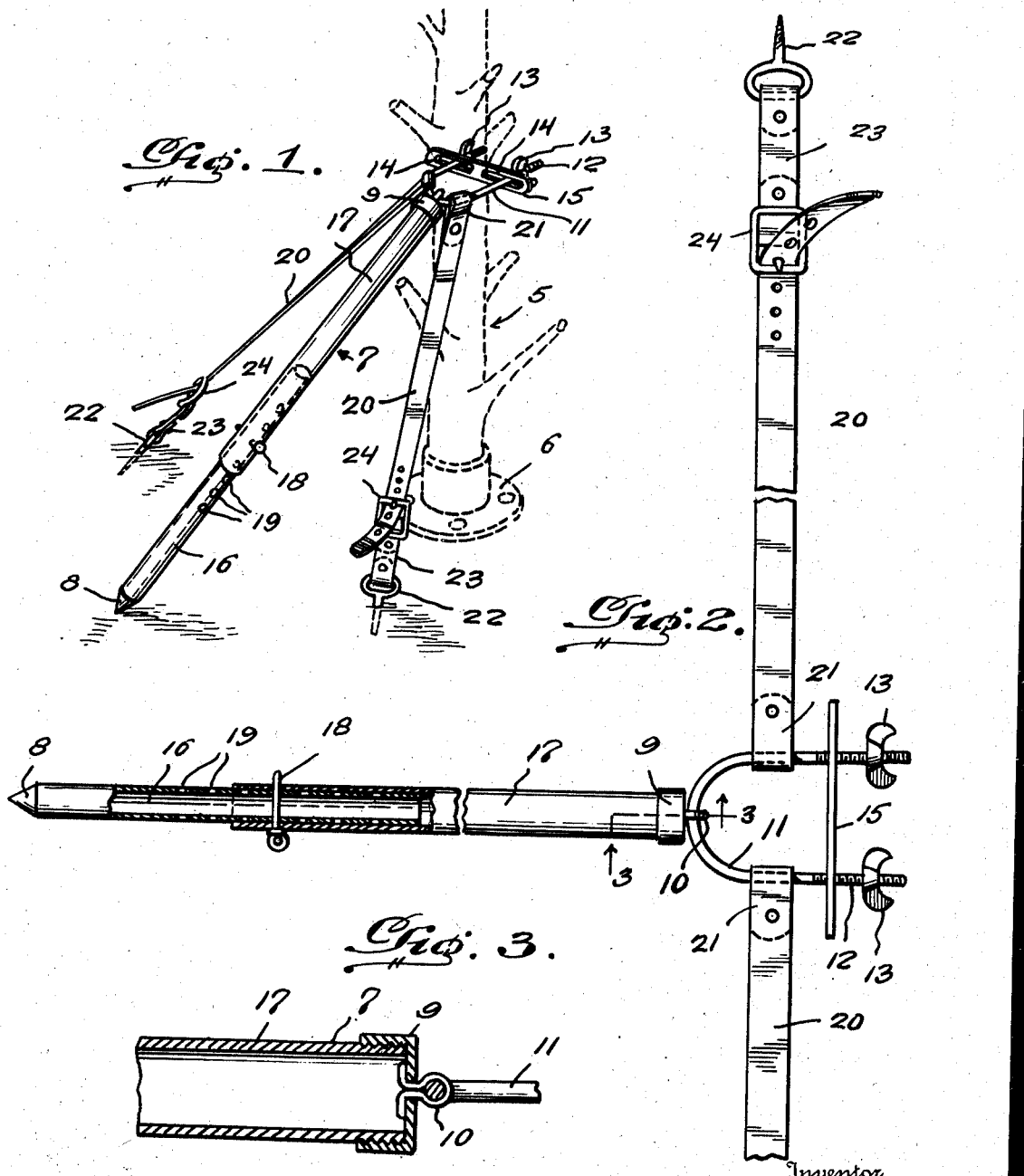

2,296,217

UNITED STATES PATENT OFFICE 2,296,217

CHRISTMAS TREE ANCHOR

John J. Maloney, Willmar, Minn.

Application May 28, 1941, Serial No. 395,653

2 Claims. (Cl. 248—351)

This invention relates to a Christmas tree anchor, and has for the primary object the provision of a device of this character which may be readily adapted to Christmas trees of different sizes to prevent the tree from accidentally falling over or being knocked over by a person coming in contact therewith or by children playing with the tree and is usable on the tree when the latter is set up within a room by any of the well known types of tree supports.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawing, in which—

Figure 1 is a perspective view illustrating a fragmentary portion of a Christmas tree sustained in an upright position by an anchor constructed in accordance with my invention.

Figure 2 is a fragmentary plan view, partly in section, illustrating the anchor before its application to a tree.

Figure 3 is a detail sectional view taken on the line 3—3 of Figure 2.

Referring in detail to the drawing, the numeral 5 indicates a fragmentary portion of a Christmas tree arranged in any well known type of tree support indicated by the character 6 which may be fastened to a floor or simply rest thereon. It is a well known fact that Christmas trees thus arranged are easily upset by children or persons coming in contact therewith and to obviate this danger the present invention is provided and may be readily adjusted to trees of different sizes. When applied to a tree and secured in place within a room the tree will be sustained from falling over.

A prop 7 adjustable as to length has a pointed end 8 to bite into the floor while its opposite end is equipped with a removable cap 9 having an eye 10 through which extends a substantially U-shaped flexible yoke 11, the ends of which are screw threaded, as shown at 12, to receive wing nuts 13.

The yoke 11 is adapted to straddle the trunk of a tree and also to extend through slots 14 provided in an elongated plate 15. The plate 15 is forced against the trunk of a tree by the wing nuts 13, thereby firmly anchoring the yoke on the tree.

It is preferable that the prop 7 be constructed of telescopic members designated by the characters 16 and 17. A key 18 extends through aligned openings in the member 17 and is insertible through any pair of a series of openings 19 provided in the member 16 whereby said members 16 and 17 may be detachably connected together and permits the prop to be adjusted as to length.

Guy straps 20 are provided with loops 21 to receive the yoke 11. Eye type fasteners 22 have straps 23 connected thereto and provided with buckles 24 to receive the guy straps 20.

The fasteners 22 may be threaded into the floor, as shown in Figure 1, or a baseboard of the room and are preferably arranged to diverge with respect to the free end of the prop 7 and coact therewith in sustaining the tree in an upright position.

Thus it will be seen that the anchor as described in detail in the foregoing and clearly shown in the drawing is easily applicable to trees of different sizes owing to the flexibility of the yoke 11 and the adjustability of the prop as to length. The prop being adjustable as to length also permits the location of the yoke on the trunk of the tree to be varied and still permit the prop to have a proper inclination when in engagement with the floor and connected with the tree as to efficiently sustain the tree in an upright position.

Furthermore, it will be seen that the guy straps 20 may be readily adjusted for tautness. Further it will be seen that a device of the character described will be extremely durable, compact and serviceable and may be manufactured at a comparatively low cost and may be usable over a long period of time such as from one Christmas to another and when removed from a tree can be stored in a comparatively small space.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a combined Christmas tree brace and anchor, a clamp adapted to a Christmas tree supported by a holder of a conventional construction, a prop adjustable as to length secured to the clamp and engaging a supporting surface for bracing the tree in the holder, and flexible anchoring elements connected to the clamp and adjustable toward and from the prop and secured to the supporting surface and cooperating with the prop in preventing the tree from rising upwardly, tilting and falling from the holder.

2. In a combined Christmas tree brace and anchor, an adjustable clamp adapted to a Christmas tree supported by a holder of a conventional construction, a prop adjustable as to length pivoted to the clamp and engaging the supporting surface for bracing the tree in the holder, and flexible anchoring elements adjustable as to length connected to the clamp and adjustable toward and from the prop and secured to the supporting surface and cooperating with said prop in preventing the tree from rising upwardly, tilting and falling from the holder.

JOHN J. MALONEY.